(12) United States Patent
TeGrotenhuis et al.

(10) Patent No.: US 10,981,141 B2
(45) Date of Patent: Apr. 20, 2021

(54) ENHANCED MICROCHANNEL OR MESOCHANNEL DEVICES AND METHODS OF ADDITIVELY MANUFACTURING THE SAME

(71) Applicant: Battelle Memorial Institute, Richland, WA (US)

(72) Inventors: Ward E. TeGrotenhuis, Richland, WA (US); Paul H. Humble, Richland, WA (US); Christopher K. Clayton, Richland, WA (US); Timothy G. Veldman, Richland, WA (US); Robert S. Wegeng, Richland, WA (US); Richard F. Zheng, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 16/449,281

(22) Filed: Jun. 21, 2019

(65) Prior Publication Data

US 2020/0001265 A1     Jan. 2, 2020

Related U.S. Application Data

(60) Provisional application No. 62/688,217, filed on Jun. 21, 2018.

(51) Int. Cl.
*B01J 19/24*     (2006.01)
*B33Y 80/00*     (2015.01)
(Continued)

(52) U.S. Cl.
CPC ......... *B01J 19/248* (2013.01); *B01J 19/0093* (2013.01); *B01J 19/2415* (2013.01);
(Continued)

(58) Field of Classification Search
CPC .. B01J 19/248; B01J 19/2485; B01J 19/2415; B01J 19/243; B01J 15/005;
(Continued)

(56) References Cited

U.S. PATENT DOCUMENTS 8,460,615 B2 *   6/2013   Persson ............... B01F 13/0818
                                                           422/209
9,950,305 B2      4/2018   Wegeng et al.
(Continued)

FOREIGN PATENT DOCUMENTS

CN       105776133 B     11/2017
CN       107930552 A     4/2018
(Continued)

OTHER PUBLICATIONS

Bellouard et al., "A high temperature drop-tube and packed-bed solar reactor for continuous biomass gasification", AIP Conference Proceedings 1850, 100001 (2017).
(Continued)

*Primary Examiner* — Lessanework Seifu
(74) *Attorney, Agent, or Firm* — Frank Rosenberg; Derek H. Maughan

(57) ABSTRACT

Chemical processors are configured to reduce mass, work in conjunction with solar concentrators, and/or house porous inserts in microchannel or mesochannel devices made by additive manufacturing. Methods of making chemical processors containing porous inserts by additive manufacturing are also disclosed.

20 Claims, 12 Drawing Sheets

(51) Int. Cl.
  *B22F 7/08* (2006.01)
  *B01J 19/00* (2006.01)
  *B33Y 10/00* (2015.01)
  *B33Y 70/00* (2020.01)
  *B22F 3/105* (2006.01)

(52) U.S. Cl.
  CPC .............. *B22F 7/08* (2013.01); *B33Y 80/00* (2014.12); *B01J 2219/00792* (2013.01); *B01J 2219/1941* (2013.01); *B01J 2219/2401* (2013.01); *B22F 3/1055* (2013.01); *B33Y 10/00* (2014.12); *B33Y 70/00* (2014.12)

(58) Field of Classification Search
  CPC ........ B01J 2219/1941; B01J 2219/2401; B01J 2219/2408; B01J 19/0093; B01J 2219/00788; B01J 2219/00792
  See application file for complete search history.

(56) References Cited

U.S. PATENT DOCUMENTS

| 10,076,739 B1 | 9/2018 | Weissman |
| 2018/0339283 A1 | 11/2018 | Wegeng et al. |

FOREIGN PATENT DOCUMENTS

| WO | 2014094088 A1 | 6/2014 |
| WO | 2013021509 A1 | 3/2015 |

OTHER PUBLICATIONS

Machine translation of Chinese Patent No. CN105776133B, granted Nov. 17, 2017.
Machine translation of Chinese Publication No. CN107930552A, published Apr. 20, 2018.
Sheu et al. "A review of solar methane reforming systems." International Journal of Hydrogen Energy, 2015, vol. 40, No. 38, 12929-12955, Hydrogen Energy Publications, LLC.
Machine translation of WO Application No. JPW02013021509A1, published Mar. 5, 2015.
Capel et al., "Design and additive manufacture for flow chemistry", Lab Chip, 2013, 13, 4583-4590.
Gutmann et al. "Design and 3D printing of a stainless steel reactor for continuous difluoromethylations using fluoroform", React. Chem. Eng., 2017, 2, 919-927.
Khodabakshi et al., "Dissimilar metals deposition by directed energy based on powder-fed laser additive manufacturing", Journal of Manufacturing Processes, 2019, 43, 83-97, Elsevier.
Li et al., "Design of a compound parabolic concentrator for a multi-source high-flux solar simulator", Solar Energy, 2019,183, 805-811, Elsevier.
Sridharan et al., "Performance of a ferritidmartensitic steel for nuclear reactor applications fabricated using additive manufacturing", Journal of Nuclear Materials, 2019, 521, 45-55, Elsevier.
Vinum et al., "Dual-Function Cobalt—Nickel Nanoparticles Tailored for High-Temperature Induction-Heated Steam Methane Reforming", Angew. Chem. Int. Ed. 2018, 57, 10569-10573, Wiley-VCH Verlag GmbH & Co. KGaA, Weinheim, Germany.
Machine translation of WO Application No. WO2014094088A1, published Jun. 26, 2014.
International Preliminary Report on Patentability from International Application No. PCT/US2019/038584, dated Dec. 22, 2020.

* cited by examiner

ENHANCED MICROCHANNEL OR MESOCHANNEL DEVICES AND METHODS OF ADDITIVELY MANUFACTURING THE SAME

RELATED APPLICATIONS

This application claims priority to U.S. provisional patent application 62/688,217, filed 21 Jun. 2018.

ACKNOWLEDGEMENT OF GOVERNMENT SUPPORT

This invention was made with Government support under Contract DE-AC0576RL01830 awarded by the U.S. Department of Energy and under a Cooperative Research and Development Agreement (CRADA No. 387) between STARS Technology Corporation, Southern California Gas Company, Oregon State University and Pacific Northwest National Laboratory, which is operated for the United States Department of Energy. The Government has certain rights in this invention.

FIELD OF THE INVENTION

In its broader aspects, the present disclosure relates to enhanced chemical processors, preferably microchannel or mesochannel devices, and methods of additively manufacturing the same. In more particular aspects, the invention relates to chemical processors associated with solar concentrators.

INTRODUCTION

Additive manufacturing (AM) is an emerging method of 'printing' devices by locally consolidating a powder material into a solid. The flexibility of designing the structure of the device, albeit within certain process constraints, offers a new tool for building complex structures. Originally, AM was developed for plastics but transitioned into metals, and the list of metals that can be 'printed' continues to grow and currently includes high temperature alloys, including Inconel and Haynes alloys. Additive manufacturing of metals is referred to as SLM—selective laser melting—or DMLS— direct metal laser sintering. This invention focuses on one type of device, chemical reactors, and more specifically chemical reactors located at the focal point of a solar concentrator that converts solar heat to chemical energy through endothermic chemical reactions. A chemical reaction of specific interest is steam methane reforming, which reacts water, $H_2O$, and methane, $CH_4$, to make hydrogen, $H_2$, carbon monoxide, CO, and carbon dioxide, $CO_2$. Alternative endothermic reactions include the reverse-water-gas shift reaction, which converts $H_2$ and $CO_2$ into $H_2O$ and CO, and cracking (dehydrogenation) of alkanes.

Reactors for exothermic reactions can also be fabricated using AM, for reactions such as the water-gas shift reaction, ammonia synthesis from $H_2$ and $N_2$, the Sebatier Process Reaction, methanol synthesis, and combustion reactions, as can hybrid reactor bodies that accommodate both endothermic reactions and exothermic reactions.

A key difference between AM and most conventional fabrication processes is material utilization, which differs greatly between 'additive' methods and 'subtractive' methods. In the latter, a solid piece of material is machined to remove material to produce the structure of the final part. Methods such as milling or photochemical machining waste a significant fraction of the starting material, as opposed to extrusion drawing, stamping, and coining methods that can have high material utilization. The cost of materials for an AM part is proportional to the part's total mass.

FIG. 1 shows a comparison between manufactured cost estimates for the TRL 6 Haynes 230 STARS reactor design using conventional 'subtractive' machining and DMLS at 1000 units per year. These costs were derived from bottoms up models that have not been entirely validated and evolve in time as cost components change, so they are more instructive than factual. The lower cost with DMLS is largely driven by lower material cost despite the higher price per pound of the DMLS powder. Conventional machining costs are also high with the high temperature alloy. FIG. 1 illustrates the motivations of the subject invention for reducing the cost of DMLS chemical reactors. The first cost driver to be addressed is mass of the reactor. Reducing the mass of the reactor has the dual benefit of reducing the powder cost (material costs) and shortening the build time which increases the throughput and reduces the per part tooling cost (amortized capital cost of the DMLS machine). Together the material and tool costs account for 63% of the manufactured DMLS cost in FIG. 1.

A second cost driver is the number of parts and assembly steps that are associated with inserting catalyst structures into the reactor. One of our prior reactor designs consists of 3 plates that are individually machined and assembled together in a high temperature diffusion brazing step after catalyst foam structures are inserted into the channels. The Laser Cutting and Diffusion Brazing steps in FIG. 1, accounts for another 28% of the manufactured cost. The invention includes approaches for reducing the number of manufacturing steps, decreasing the number of parts, and/or simplifying the assembly process.

There are other potential benefits of new reactor designs related to performance and lifetime. The outer wall of the reactor must be thick enough to support the internal pressure, and thicker walls require more temperature difference across the wall for the same heat flux. For endothermic reactions that receive heat through the walls of the reactor, such as heat from a solar concentrator, a larger temperature difference means colder catalyst bed temperature in order to keep the reactor surface temperature below the reactor metallurgy limit. For endothermic reactions such as steam methane reforming, a higher reaction temperature leads to a higher equilibrium conversion as well as faster kinetics. Thinning the reactor walls not only saves materials of construction and build time with DMLS, but also allows the catalyst to be hotter and therefore more active which saves catalyst costs and reduces reactor size. Thicker walls are also detrimental to reactor lifetime because of higher thermal stresses due to increases in both temperature difference and structural rigidity. Furthermore, DMLS allows more flexibility in designing a 3D structure that can better accommodate thermal expansion, thereby reducing internal stresses and low-cycle fatigue failure associated with daily or more frequent heating and cooling cycles of the structure during solar operations.

SUMMARY OF THE INVENTION

In a first aspect, the invention provides a solar-powered apparatus, comprising a solar concentrator having a concave shape and a dome-shaped chemical processor is adapted to conduct a unit operation is disposed in relation to the solar concentrator so that the convex face of the dome-shaped chemical processor faces the concave face of the solar concentrator; and wherein the convex face of the chemical processor comprises a tube or tubes for passage of a fluid to or from a central area of the dome to the peripheral area of the dome. In some preferred embodiments, the apparatus may comprise one or any combination of the following features: wherein convex face of the dome-shaped chemical processor comprises a tube or tubes that are exposed on the surface of the dome; wherein the convex face of the dome-shaped chemical processor comprises a tube or tubes comprise a methane reforming catalyst or a reverse-water gas shift catalyst; wherein the convex face of the dome-shaped chemical processor comprises a tube or tubes providing radial fluid flow from a source inlet or source manifold near a central region of the dome to a perimeter of the dome and comprising a plurality of channels providing radial fluid flow from the perimeter to a receiving manifold, wherein the receiving manifold is located near the central region of the dome; wherein the tube or tubes comprise a porous catalyst insert, preferably a methane reforming catalyst; wherein the tube or tubes comprise two portions, a first portion and a second portion, that are separated by a nonporous, thermally conductive divider, wherein the first portion comprises a catalyst and wherein the perimeter of the device comprises an opening in the divider so that flow from the first portion can pass into the second portion.

In another aspect, the invention provides a chemical processor comprising a channel or a plurality of channels having a first portion providing radial fluid flow from a source manifold to a perimeter of the device and a second portion providing radial fluid flow from the perimeter to a receiving manifold, wherein the source manifold and the receiving manifold are located near a central region of the device, and wherein the device is configured for a unit process; and wherein the first portion and the second portion in each channel are separated by a nonporous, thermally conductive divider, wherein the first portion comprises a catalyst and wherein the perimeter of the device comprises an opening in the divider near the perimeter of the device so that flow from the first portion can pass into the second portion. The chemical processor can have any of the features described throughout the descriptions and drawings herein.

In a further aspect, the invention provides a microchannel or mesochannel device comprising a first plurality of microchannels or mesochannels providing radial fluid flow from a source manifold to a perimeter of the device and a second plurality of channels providing radial fluid flow from the perimeter to a receiving manifold, wherein the source manifold and the receiving manifold are located near a central region of the device, and wherein the device is configured for a unit process; and further comprising a catalyst insert or plurality of catalyst inserts disposed around the perimeter of the device where the direction of flow in the channels switches from toward the perimeter to away from the perimeter, and comprising a ring disposed around the periphery of the device that encloses the catalyst insert or plurality of catalyst inserts and a flow path where the direction of flow in the channels switches from toward the perimeter to away from the perimeter. In some preferred embodiments, the catalyst inserts are wedge-shaped. This device can have any of the features described throughout the descriptions and drawings herein.

In another aspect, the invention provides a chemical processor having a circular shape comprising a tube or a plurality of tubes providing radial fluid flow from a source inlet or source manifold near a central region of the processor to a perimeter of the processor, wherein the tube or first plurality of tubes is exposed on a surface of the device so that the surface is not smooth; wherein the tube or plurality of tubes have a cross-section that is circular, oval, or oblate circular, and wherein the processor is configured for a unit process. The invention also includes the reverse configuration wherein a source inlet or source manifold and receiving manifold are located near the periphery of the device. In some preferred embodiments, the apparatus may comprise one or any combination of the following features: comprising a plurality of channels providing radial fluid flow from the perimeter to a receiving manifold, wherein the receiving manifold is located near a central region of the device; wherein the tube and channels have an internal dimension of 1 cm or less; wherein the tube or plurality of tubes, the plurality of channels, or both comprise a bifurcating channel that splits into two or more channels as it extends radially; wherein the tube or plurality of tubes, the plurality of channels, or both comprise a straight radial channel; wherein the tube or plurality of tubes, the plurality of channels, or both comprise a curved channel extending from the central region to the perimeter; wherein the tube or plurality of tubes, comprises a porous insert embedded within the tube or plurality of tubes; wherein the porous insert comprises a catalyst material, a sorbent material, or both; wherein the porous insert comprises porous metallic support having a nonporous metal film welded to a surface of the porous metallic support; wherein the porous insert comprises a metal, a polymer, or a metal oxide; wherein the process has a domed structure; further comprising a solar concentrator arranged to focus concentrated solar energy at the exposed surface; wherein the tube or plurality of tubes have a gradient of thermal expansion coefficients with the low thermal expansion coefficient on the exposed surface of the tube or plurality of tubes.

The invention also includes methods that correspond conducting one or more unit operations comprising use of each of the devices. Preferably, the unit process is selected from the group consisting of exothermic chemical reaction, endothermic chemical reaction (preferably methane reforming), heat exchanger, chemical separation, and thermal separation.

In a further aspect, the invention provides a method of fabricating a microchannel or mesochannel device comprising the steps of forming layer-by-layer a first portion of a channel via an additive manufacturing process; embedding a porous insert into the first portion of the channel; covering the porous insert with a protective layer; and forming layer-by-layer a second portion of the channel over the first portion. In some preferred embodiments, the invention comprises one or more of the following features: wherein the microchannel or mesochannel device is a differential temperature microchannel or mesochannel device; wherein the protective layer comprises a sacrificial material that is removed after the step of forming layer-by-layer a second portion of the channel over the first portion; (the sacrificial material can be a material that melts at a temperature at least 100° C. (or at least 300° C.) below the melting point of the second portion); comprising a step of laser welding the protective layer over the porous insert; wherein the additive manufacturing process comprises direct metal laser sintering; wherein the porous insert comprises a catalyst material, a sorbent material, or both; wherein the porous insert is a metal, a polymer, or a metal oxide; wherein the porous insert is made by joining a protective layer onto a porous metallic support and then coating the porous metallic support with a metal oxide and nickel or a noble metal to form a methane reforming catalyst followed by calcining prior to disposing the insert into the channel.

The invention also includes methods of making or refurbishing a chemical processor comprising inserting a porous insert (preferably a catalyst) into a device and welding a plug or weld ring to seal the flow path at the periphery of the device.

Aspects of the invention may also include placing structures within the flow channels for enhancing convective flow heat transfer and/or to improve flow distribution between channels. Generally, any of the inventive aspects can be modified in accordance with any feature or combination of features provided in the Detailed Description.

In various embodiments, advantages of the invention can include: reducing the mass of the device, improving heat transfer, improving durability and service life, and facilitating more uniform thermal profiles or otherwise varying and/or controlling the temperature of the reaction to achieve efficient operation.

Glossary

As is standard patent terminology, "comprising" means "including" and neither of these terms exclude the presence of additional or plural components. In alternative embodiments, the term "comprising" can be replaced by the more restrictive phrases "consisting essentially of" or "consisting of."

A "microchannel" is a channel having at least one internal dimension (wall-to-wall, not counting catalyst) of 1 mm or less, and greater than 1 μm (preferably greater than 10 μm), and in some embodiments 50 to 500 μm; preferably a microchannel remains within these dimensions for a length of at least 1 cm, preferably at least 20 cm. In some embodiments, in the range of 5 to 100 cm in length, and in some embodiments in the range of 10 to 60 cm. Microchannels are also defined by the presence of at least one inlet that is distinct from at least one outlet. Microchannels are not merely channels through zeolites or porous materials. The length of a microchannel corresponds to the direction of flow through the microchannel. Microchannel height and width are substantially perpendicular to the direction of flow of through the channel. Mesochannels are similarly defined except having an internal dimension of 1 mm to 1 cm. Typically, devices comprise multiple micro- or mesochannels that share a common header and a common footer. Although some devices have a single header and single footer; a microchannel device can have multiple headers and multiple footers. The volume of a channel or manifold is based on internal space. Channel walls are not included in the volume calculation.

Particulate refers to particles such as catalyst particles that fit within a micro- or mesochannel. Preferably, the particles (if present) have a size (largest dimension) of 2 mm or less, in some embodiments, 1 mm or less. Particle size can be measured by sieves or microscopy or other appropriate techniques. For relatively larger particles, sieving is used. The particulate may be catalyst, adsorbent, or inert material.

The invention also includes methods of conducting unit operations within the apparatus described herein. "Unit operation" means chemical reaction, vaporization, compression, chemical separation, distillation, condensation, mixing, heating, or cooling. A "unit operation" does not mean merely fluid transport, although transport frequently occurs along with unit operations. In some preferred embodiments, a unit operation is not merely mixing.

A channel containing a catalyst is a reaction channel. More generally, a reaction channel is a channel in which a reaction occurs. Reaction channel walls are preferably made of an iron based alloy such as steel, or a Ni-, Co- or Fe-based superalloy such as Haynes. The choice of material for the walls of the reaction channel may depend on the reaction for which the reactor is intended. In some embodiments, the reaction chamber walls are comprised of a stainless steel or Inconel® which is durable and has good thermal conductivity. Typically, reaction channel (typically, tube) walls are formed of the material that provides the primary structural support for the microchannel apparatus.

Heat exchange fluids may flow through heat transfer channels (preferably micro- or mesochannels) adjacent to process channels (preferably reaction micro- or mesochannels), and can be gases or liquids or biphasic materials and in preferred embodiments, the heat exchange fluid is a product stream used to recuperate heat generated in the reaction channel.

A "tube" has the conventional meaning of an elongated member having a cross-section that is either circular, rectangular with a pair of semi-circles at opposite ends (this would be an example of oblate circular as shown in FIG. 8), or oval. There are no corners on either the interior or exterior and therefore no regions where stress concentrates. The wall thickness of a tube is preferably uniform and varies by no more than 10% although it may contain an interior dividing wall (barrier) having a different thickness that divides the interior of the tube into 2 or more channels. As shown in the figures, there may be corners between the dividing wall and the tube wall but typically, there is not a large pressure difference across the interior dividing wall.

An "exposed" tube has a surface that is exposed to the environment. It is not covered by a plate—the surface of an exposed tube is curved.

BRIEF DESCRIPTION OF THE DRAWINGS

The first drawings show a cost comparison between FIG. 1(a) a conventionally machined Haynes 230 solar thermochemical reactor costing $US2288 and FIG. 1(b) one made by DMLS costing $US1682.

DETAILED DESCRIPTION OF THE INVENTION

Figure 1A:
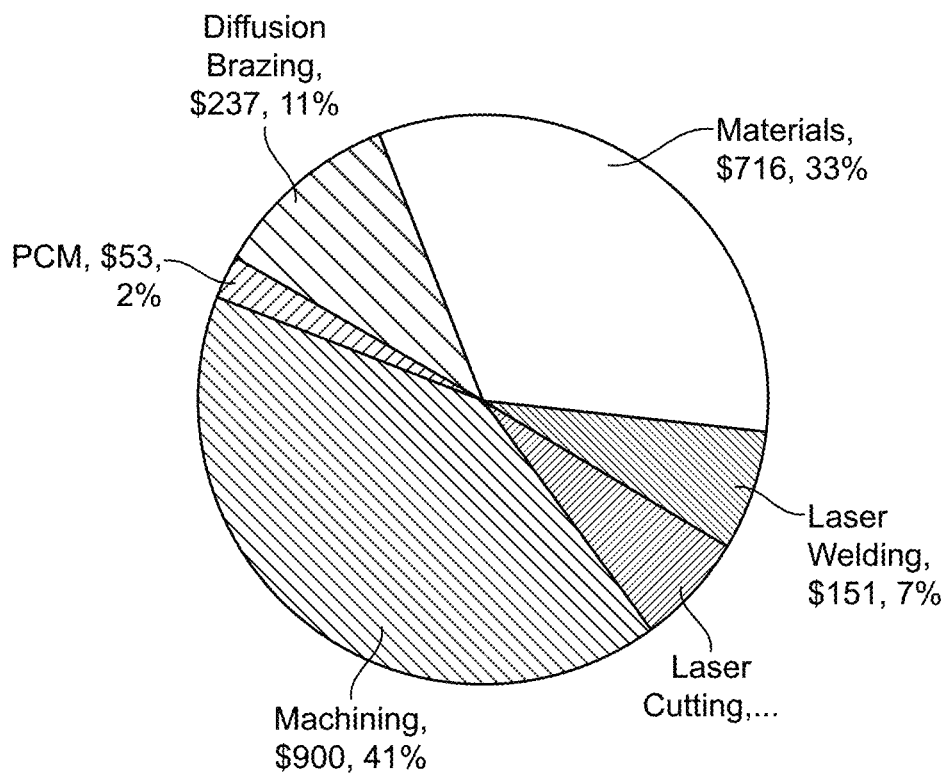
Figure 1B:
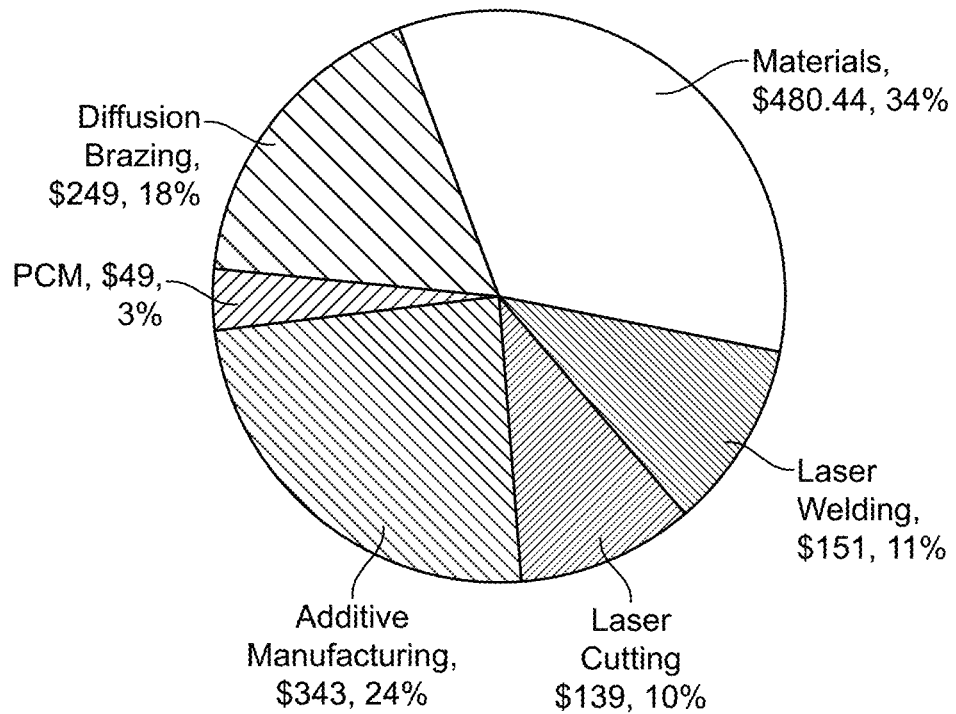

The invention includes devices, methods of making, and processes involving devices made using additive manufacturing processes. Methods of making may include ways of embedding catalyst or other structures as foreign bodies into devices as they are being made using additive manufacturing processes. Alternatively, porous or other high surface area structures could be built by AM processes during fabrication and then activated post-build through coating, impregnation, or removal processes. Various structures are described that can be made by additive manufacturing that are suitable as receivers for parabolic dish solar concentrators.

There are several articles in the literature that describe apparatus made by AM; for example, Gutmann et al., React. Chem. Eng., 2017, 2, 919-927, *"Design and 3D printing of a stainless steel reactor for continuous difluoromethylations using fluoroform."* Stark, AIChE Journal, (2018) 64(4): 1162-1173, *"Manufactured Chemistry: Rethinking Unit Operation Design in the Age of Additive Manufacturing."* Capel et al., Lab Chip, 2013, 13, 4583, *"Design and additive manufacture for flow chemistry Article in Lab on a Chip."* Schalansky in United States Patent Application 2015/0137412 entitled "Method of using additive materials for production of fluid flow channels" describes some AM methods of making flow channels and the content of this published patent application is incorporated herein as if reproduced in full below. Several graded metallic structures manufacturable by AM are described by Khodabakhshi et al. in "Dissimilar metals deposition by directed energy based on powder-fed laser manufacturing," J. Manufacturing Processes 43 (2019) 83-97. In the present invention, walls of the tubes can be made with graded properties such as thermal expansion; in a preferred embodiment, the side of tubes facing the solar source have a lower thermal expansion coefficient than the side of the tubes facing away from the solar source; the gradient may be continuous from the highest expansion coefficient at the bottom (away from the solar source) to the lowest expansion coefficient at the top, or may be in two, three, or any selected number of regions. In some embodiments, the graded thermal expansion coefficients may be on just the side of the tube that receives heat from the solar concentrator.

The invention also includes devices adapted to receive incident solar radiation and use the absorbed energy for endothermic processes, including endothermic chemical reactions, heating of fluids, and separation processes. The general arrangement is radial flow from a central manifold out to the perimeter of the plate and then returning the flow through a second set of channels to a second receiving manifold near the center before exiting the device. Structures include bifurcating tubes that split into two or more (preferably two) tubes as they extend radially to facilitate covering all or the majority of the circular profile. The tubes can be straight along a radius of the circle or curved. The limit of curved channel structures is a single coiled channel starting at the center and extending out to the perimeter. The return channels can be a mirror of the outflow channels allowing fluid to return along the same flow path through an adjacent channel. Many alternative structures are anticipated that have different structures for the outward flow and the return flow that would facilitate heat spreading for more uniform temperatures and for enhanced mixing of the fluid. The invention includes structures that are planar—principle flow axes of the channels are planar or 3-dimensional with channels curving out of plane in the 'z-axis'.

Some aspects of the invention also include placing structures within the flow channels for enhancing convective flow heat transfer and/or to improve flow distribution between channels. Enhanced heat transfer structures include fins, louvered fins, pins for extended heat transfer area, and structures for convective mixing of fluids.

Figure 2A:
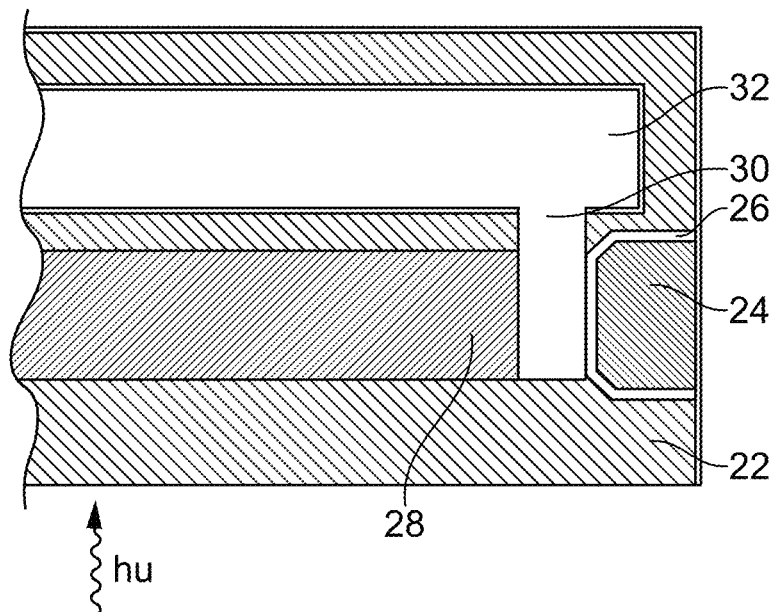
FIG. 2A is a cross-sectional view of the lower part of the reactor in FIG. 2B.
Figure 2B:
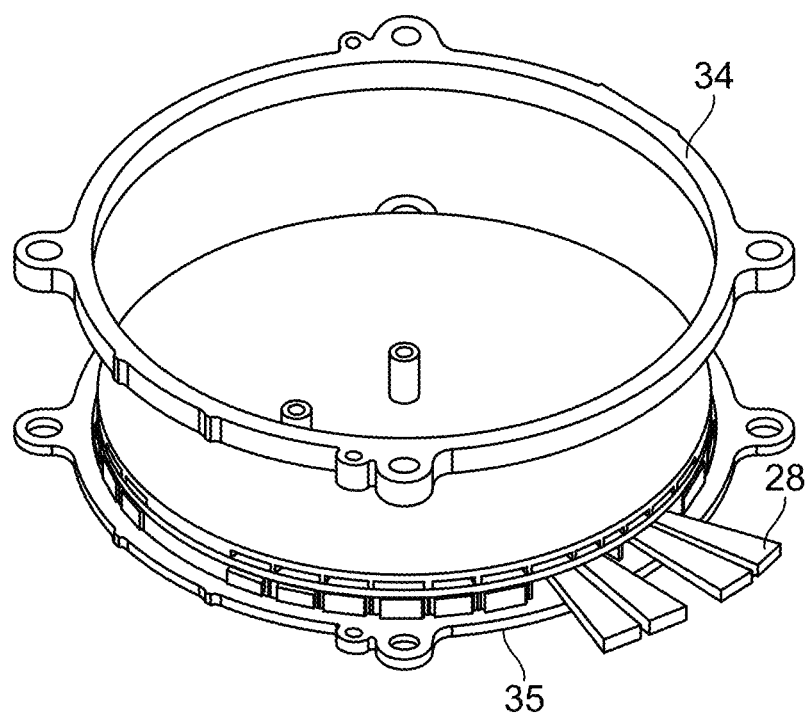
FIG. 2B is a two-piece assembly solar reactor-receiver.

Two-Part Assembly:

FIG. 2 shows an embodiment for reducing the assembly to two parts and eliminating the high temperature diffusion brazing step that requires a long-cycle time in a furnace equipped with a ram-press. The gradual heat-up and cool-down of the furnace as well as time at temperature to allow the parts to bond can require multiple days leading to relatively low production capacity. Building the main body of the reactor-receiver as a single part with additive manufacturing results in substantial materials savings. FIG. 2B shows a two part assembly of a chemical processor. In a first step, a channel-containing chemical processor part 35 can be made by AM. Next, The catalyst pieces (which may be rectangular or other shape such as the illustrated pie-shaped pieces) 28 are then be inserted into the openings around the perimeter as shown in FIG. 2B, before closing the reactor by welding a sealing ring 34 in place. In another embodiment, the majority of the reactor-receiver body is built with additive manufacturing as shown in FIG. 2B but the channel openings are fashioned as circular holes so that they can be individually sealed, for example with individual beveled plugs, instead of a single weld ring for all channels. The channel ends can be sealed, after catalyst insertion, by sealing with a weld ring as shown in FIG. 2B. In some preferred embodiments, the weld ring is welded into place with rotary friction welding. In an alternative embodiment, plugs can be welded into place for example by a welding effect created by rotating beveled plugs as they are inserted into similarly beveled holes. The weld ring can be welded in place by conventional or friction stir welding as examples of other joining processes, i.e. laser welding or electron beam welding. In the finished device, heat energy (such as impingement of photons) enters the system through exposed channel or tube wall 22. FIG. 2A is a cross-sectional view shows exposed wall 22, catalyst insert 28, channel plug 24 fixed in place by joint 26, and return channel 32. Chemical products flowing out from catalyst insert 28 flows through opening 30 into return channel 32. In an alternative embodiment, a porous insert 28 (such as an adsorbent) is used in place of the catalyst insert 28.

One significant advantage of this design is the potential for refurbishing the reactor by removing the ring or individual channel end caps to access and replace the catalyst pieces. This extends the life of the reactor hardware with long-term savings in replacement costs and facilitates recycling the materials of the catalyst structure. The invention includes the methods of forming the processor, refurbishing the processor, chemical apparatus, and performing unit operations in the apparatus.

Figure 3:
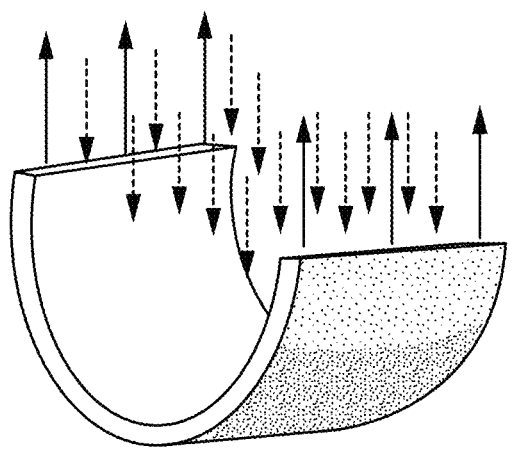
FIG. 3 shows hoop stress. The only stress acting in the vertical direction which can counteract the applied pressure is the normal stress (solid arrow) $\sigma_1$. This stress is called the "hoop stress" because it acts like a steel hoop around a wooden barrel.

Tubular Design:

Several embodiments of the invention utilize tubular construction to take advantage of the inherent strength of round tubes versus flat walls. Flat walls with a higher pressure on one side experience a bending force that must be supported, typically either by thickening the wall or by adding supports or stiffeners. On the other hand, the walls 82 (see FIG. 8) of pressurized round tubes experience principally tensile stresses, referred to as hoop stresses, as described in FIG. 3. The result is that round tubes can have much thinner walls than flat walls when made out of the same strength material. Therefore, AM designs that consist of tubular channels instead of rectangular channels with flat walls have the potential for significant weight savings due to thinner walls. The interior diameter (or largest dimension) of the tube is preferably in the range of 0.1 mm to 3 cm, preferably 1 mm to 1.0 cm. For example, a rectangular plate 0.4 inch wide with a yield stress of 450 psi (Haynes 230 at 982° C.) needs to be 0.165 inch thick to support a pressure of 10 bar. Alternatively, the wall thickness of a tube with the same yield stress is only 0.065 inch thick to support a press of 10 bar. The AM bifurcating tube method also enables smaller tubes. Starting with 10 tubes at the central headers, the required wall thickness varies from 0.025 in at the start of a tube length and increases continuously to 0.049 inch at the end of a tube length. Another advantage of AM is the ability to vary wall thickness locally to optimize weight. An extruded tube is going to have a constant diameter and wall thickness. An AM tube can have varying diameter and wall thickness which is embodied in the bifurcating tube design.

The advantage of the tubular geometry is substantial where the outer wall of the tube is also the outer wall of the reactor and is reduced where the tube wall is not an outer wall. The outer wall of the reactor must be thick enough to support the internal pressure, for externally heated reactor and/or endothermic reaction channels, and thicker walls require more temperature difference across the wall for the same heat flux. A larger temperature difference means colder catalyst bed temperature in order to keep the reactor surface temperature below the reactor metallurgy limit. For an endothermic reaction such as steam methane reforming, a higher reaction temperature leads to a higher equilibrium conversion as well as faster kinetics. Thinning the reactor walls not only saves materials of construction and build time with AM, but also allows the catalyst to be hotter and therefore more active which saves catalyst costs. Thicker walls are also detrimental to reactor lifetime because of higher thermal stresses due to increases in both temperature difference and structural rigidity. Furthermore, DMLS allows more flexibility in designing a 3D structure that can better accommodate thermal expansion, thereby reducing internal stresses and low cycle fatigue failure associated with daily or more frequent heating and cooling cycles of the structure during solar operations. These latter potential benefits associated with performance and lifetime are under consideration.

Another innovation associated with the tubular embodiments is inserting the catalyst structures into the reactor during the additive build. This not only gives additional flexibility in designs because the design does not have to accommodate catalyst insertion after the part is built, but the total number of fabrication steps is reduced. The sequence of steps are 1) the reactor is partially fabricated by AM (preferably DMLS), 2) the build is stopped, the platen is raised, and powder is vacuumed from the catalyst channels, 3) the catalyst pieces are inserted into the catalyst channels, and 4) the AM process is restarted to finish the build. Preferably, the top edge of the catalyst pieces are flush in one plane to accommodate the continuation of the AM build. The steps of stopping the build, removing powder from the catalyst channels, and inserting the catalyst pieces lengthen the build cycle time, in place of post-build steps required to insert catalysts and close the reactor.

Several embodiments of the Tubular Design innovation are described below.

Catalyst Structures:

Multiple types of catalyst structures can be incorporated into the inventive devices. In some instances, catalyst structures such as porous foams or felts are inserted into channels, with one concept described above. Powder or particulate catalyst media could also be added as a dry media or slurry. The active catalyst can be embedded in the structure when loading the support or can be added after assembly is complete, using various methods including calcining, vapor deposition and wash coating. Alternatively, porous catalyst structures can be printed during the build by modifying process parameters that would partially consolidate the powder leaving a sintered porous media of high surface area. Alternatively, surface area could be added by building additional internal structures inside the channels, such as fins or pillars to be coated with catalyst that could also serve as extended area for enhancing heat transfer.

Figure 12:
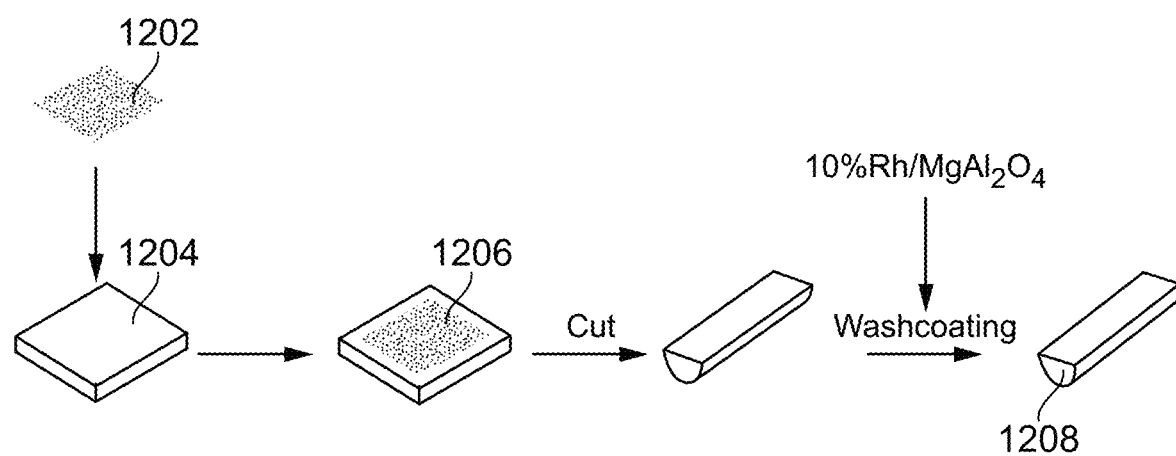
FIG. 12 schematically illustrates a process of making a porous insert adapted for insertion into a chemical processor in an AM process.

We prepared methane steam reforming catalysts by first placing a protective layer 1202 over a catalyst insert structure 1204 (a FeCrAlY foam sheet). The protective sheet can be tack welded or laser welded to the porous structure 1204 to form protected porous structure 1206. The porous structure can be converted to a methane reforming catalyst by, for example, washcoating the structure with a catalyst of Rh on $MgAl_2O_4$ followed by calcining at 500° C. to form porous catalyst insert 1208. This process is illustrated in FIG. 12. The catalyst was placed into a channel and the channel completed by AM. Testing of the device showed excellent methane conversion and hydrogen production with no loss in activity after two cycles of use at a temperature of at least 750° C.

We found that excessively heating the cover after the DMLS process was restarted caused it to warp out of plane causing a process failure because the cover becomes an obstruction to the powder spreader bar. The laser would also burn holes through the cover causing damage to the cover and the insert below the cover as well as allowing powder to intrude into the cavity. The solutions to these problems included using a laser (the DMLS laser in our testing) to tack weld the cover to the build structure. This occurs after the structure and cover are inserted and before powder is spread back over the part. Experimentation showed that the tack welding must be controlled, just enough to hold the cover in place or stitch weld the entire perimeter to effectively seal the perimeter from powder. Improved results were obtained by making several passes around the perimeter to allow a spot weld to cool adequately before welding again in the same vicinity. Another solution is to modulate the laser power and the powder layer thickness after the DMLS build process is resumed. This allows the building of the AM structure to resume on top of the insert and cover without causing damage to those parts.

When the complete reactor is made by AM with the catalyst embedded, the catalyst cavities have to be protected from AM powder intruding through the ends as well as the 'top'. The ends have to allow flow, so the catalyst chamber can be enclosed using porous walls that allow flow. One porous wall will be at the inlet end toward the central inlet manifold. The powder on that side may come out through the manifold. The second porous wall is located right at the end of catalyst channel before the opening that drops down to the return layer. A substantial amount of the powder in the perimeter header and the return channels has to come out the central header of the return channels. An additional advantage of the porous walls is that they create pressure drop for good flow distribution in a multi-channel device, thus eliminating the need for orifices or other features to control (typically, equalize) flow through a plurality of channels.

Yet another method of inserting and protecting a catalyst structure from substantial intrusion with AM powder may be enabled by the use of a sacrificial material. Impregnating the catalyst structure with a solid material that can be removed after heating or reacting (to create a fluid) would eliminate the need for porous walls and the use of the 'top' piece. For example, a high molecular weight oil (e.g., paraffin) could fill the voids within the catalyst structure, then be heated the reactor build process is completed, to remove melted or gaseous material.

Figure 4:
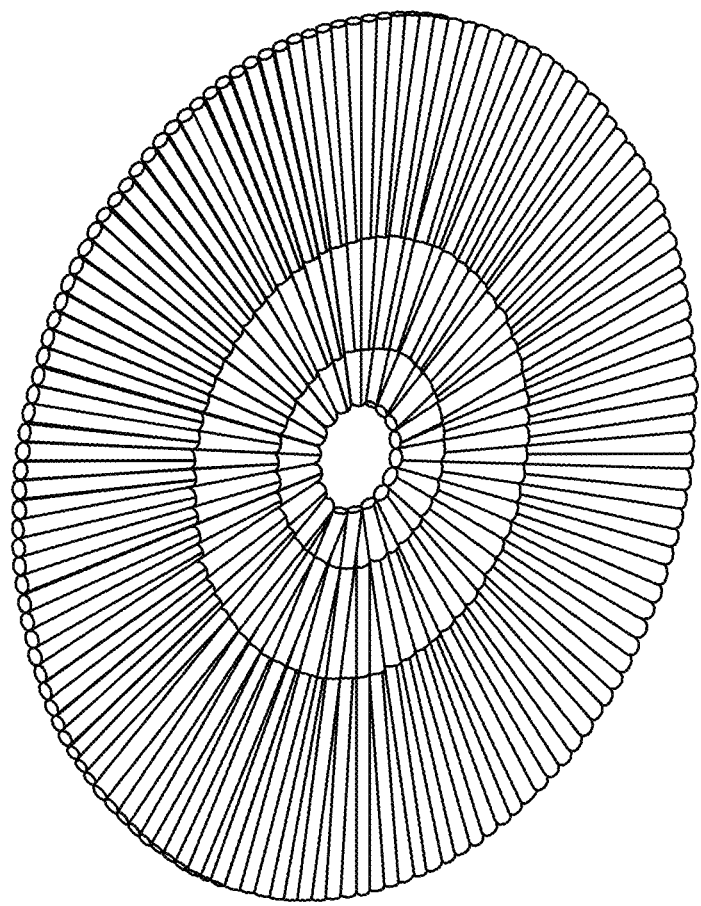
FIG. 4 shows a bifurcating tube chemical processor.
Figure 5:
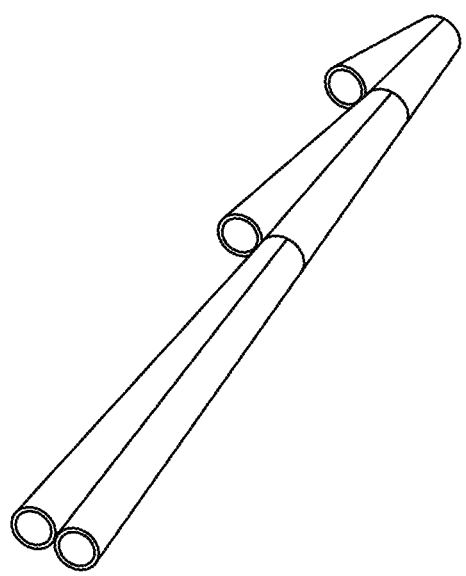
FIG. 5 shows a bifurcating tube.
Figure 6:
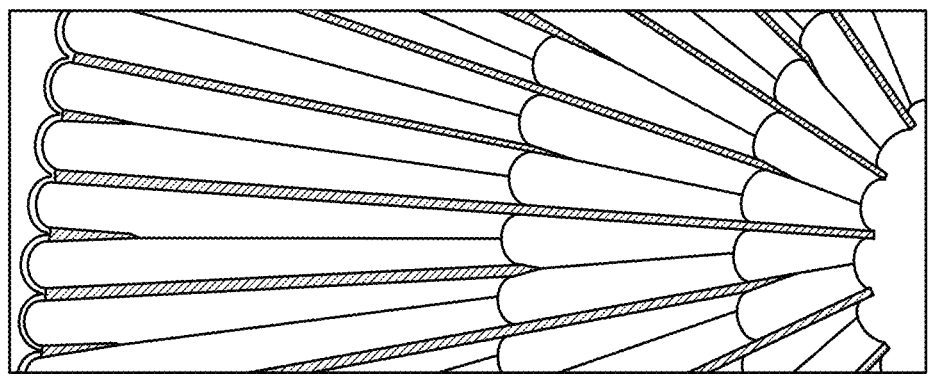
FIG. 6 is a cross-sectional view of the bifurcating tube chemical processor.

Bifurcating Constant Radius Tubes:

FIG. 4 depicts the first embodiment of the tubular design where a set of tubes extend radially outward from a center manifold. In order to completely cover a circular area, the tubes bifurcate as they extend out radially. In this particular embodiment the tubes have a constant diameter, so the reactor thickness is consistent over the area. The process of tube splitting is illustrated in FIG. 5. A tube starts out with a round cross section and immediately begins to bifurcate and slowly evolve to a FIG. 8 cross section where the splitting is complete. From there, both tubes begin repeating the bifurcation process as they extend out further. Mathematically, the tubes bifurcate every time the distance from the center of the circle doubles. FIG. 6 further illustrates how tubes periodically bifurcate.

In one embodiment of this concept, internal walls are in the tubes that split the channels into two halves, which are not shown in FIGS. 4-6. Catalyst structures would be inserted into one half of the channels during the DMLS build before the dividing wall is constructed. The opposite side of the tubes could be used for heat exchange, such as preheating the incoming reactants or recuperating heat from the product stream for heat of reaction in the catalyst structures. In other embodiments, catalyst structures are built inside the tubes, such as sintered porous media, walls, or pillars that would subsequently be coated with a catalyst after the DMLS build is complete.

Bifurcating Increasing Radius Tubes:

Another embodiment of the tubular design is tubes of increasing radius. Instead of a tube gradually bifurcating as it extends out radially, it remains a tube and grows in diameter and then divides into two tubes of half the diameter at some radius from the center. Each of the two tubes grow in diameter as they extend radially until they also split into two tubes. The minimum amount of wall material is used when the internal walls stresses are kept constant at the allowable stresses for the material. For a tube, the maximum stresses are the hoop stresses with the relationship for the thin-walled assumption:

$$\sigma = \frac{pr}{t} \quad (1)$$

Where p is the design pressure, r is the tube radius, and t is the tube wall thickness. Maintaining a constant wall stress while the tubes grow in diameter requires increasing the wall thickness. Integrating equation 1 over a length, l, of growing tube from diameter D1 to D2, gives the minimum wall volume for a given allowable stress, σ, $$V_w = \frac{\pi}{6} \frac{pl}{\sigma} (D_2^2 + D_2 D_1 + D_1^2)$$

Figure 7:
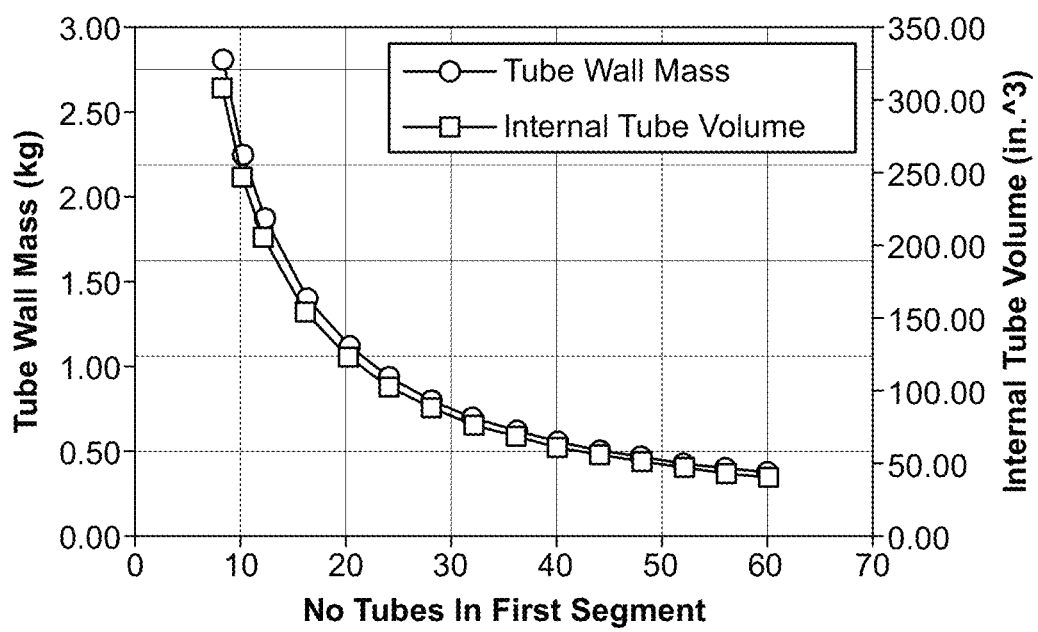
FIG. 7 is a graph of tube wall mass and internal tube volume versus the number of tubes of a bifurcating tube reactor with increasing tube radius for a 0.5 in center hole and ½ inch first length.

The parameters that go into the bifurcating tubes structure are the center hole radius, the number of initial tubes extending from the center hole, and the length of the first segment. FIG. 7 illustrates the tube wall mass versus number of tubes extending from the center hole for a ½" center hole and ½" first length. The mass of the TRL6 reactor built on the DOE EERE Solar project weighed 4.58 kg, there is the potential for an order of magnitude reduction in mass of the reactor and subsequently cost of an additively manufactured reactor. However, other design considerations are the total amount of catalyst and heat transfer from the reactor wall to the catalyst. The TRL 6 reactor had 243.25 cm3 of catalyst structure and if only half the tube volume contains catalyst, then that amount of catalyst volume will not fit inside the tubes of this reactor, as shown in FIG. 7. Furthermore, the diameter of tubes get larger than 0.5 in. when the array starts with less than 10 tubes, which is much larger than the 5 mm (⅕") thickness of the catalyst in TRL 6. The resulting increase in heat transfer distance will be problematic.

Figure 8:
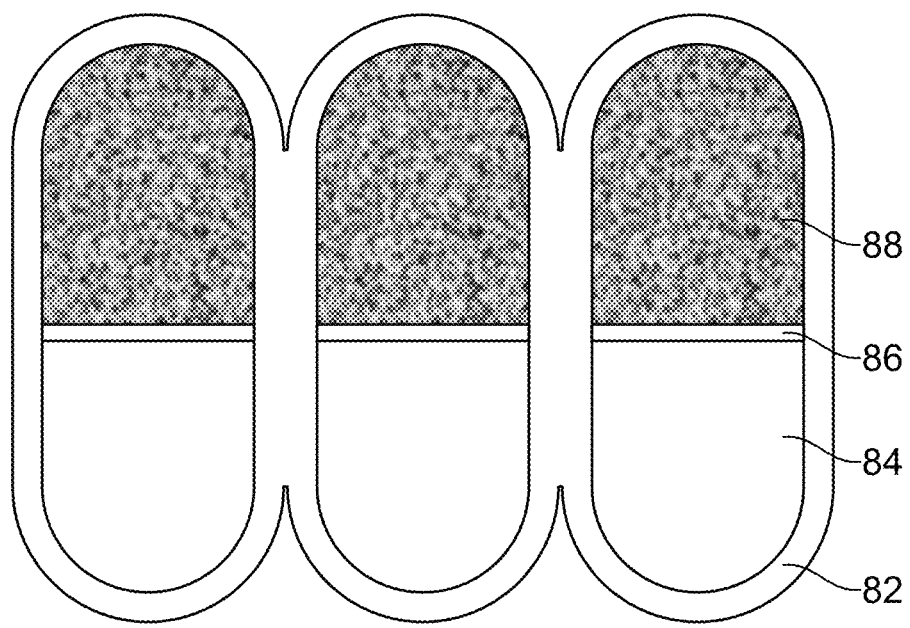
FIG. 8 illustrates a cross-section of three adjacent tubes where the cross-section has a capsule structure.
Figure 9:
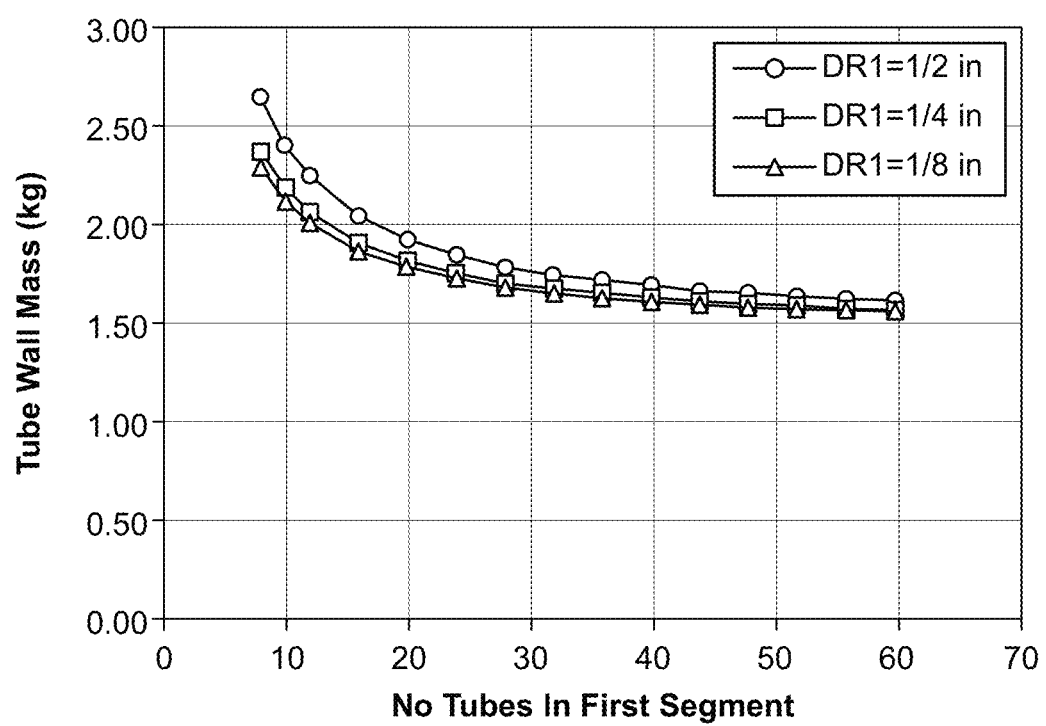
FIG. 9 is a graph of tube wall mass versus the number of tubes of a Haynes 230 bifurcating tube reactor with increasing tube radius for a 0.5 inch center hole and 3 starting tube lengths.

Both the catalyst volume and heat transfer distance issues are overcome by modifying the tube cross-section from a circle to a capsule shape shown in FIG. 8. The walls dividing the capsule-shaped tubes are twice the rounded wall thickness to maintain the same maximum wall stress. The height of the straight wall becomes a parameter that can be varied to provide enough internal volume to accommodate the desired catalyst volume. FIG. 9 shows the wall mass for the capsule-bifurcating-tube reactor with a constant internal volume of 487.5 cm3. The wall mass calculations indicate a potential of up to ⅔ savings in wall mass from the 4.58 kg TRL 6 reactor. The mass savings diminish with more than about 30 tubes extending from the central hole. With 20 initial tubes the maximum catalyst thickness in the direction of incident solar is 6-7 mm, which is close to TRL 6 catalyst thickness of 5 mm. The rounded 'humps' on the outer surface and the thinner walls will more than compensate for the nominally thicker catalyst. With 20 tubes extending from a ½" central hole and ¼" initial tube length, the tube wall mass is 1.83 kg, the minimum diameter is 0.101", the maximum diameter is 0.202", the height of the internal walls is 0.333", and the catalyst thickness is 6.8 mm.

An alternative approach would be to maintain a constant reactor thickness by varying the height of the dividing wall as the diameter changes. This may be easier to fabricate because the catalyst thickness would be uniform.

Spiral Tubes:

The structures shown in FIGS. 4 to 6 have straight tubes extending radially from a center hole. In other embodiments, the tubes are curved and spiral from the center to the outer edge. See FIG. 10. Spiral structures have been previously adopted for solar reactor-receivers to accommodate non-uniform incident solar flux on the reactor surface. In the limit, a single spiral tube coiled similar FIG. 11 would cover the entire area receiving incident solar flux. The coiled shape could also be made with the capsule cross-section depicted in FIG. 8, except the adjacent channels represent adjacent coils of the same tube instead of separate tubes as previously described. Similar reactor mass savings are anticipated by having thinner walls, as previously described for other structures. The difficulty with a single coiled tube or capsule tube is the much longer channel length will increase pressure drop. This can be mitigated by having two or more coils starting from the center and coiling out to the perimeter. In yet another embodiment, the coils could bifurcate at one or more points in the spiral. Hence, there is a myriad of combinations of structures from straight bifurcating tubes to bifurcating curved tubes to a single coiled tube. The selection of a structure is driven by performance, pressure drop, manufactured cost, and reactor reliability and lifetime.

Return Channels:

Reactor designs with radial flow channels typically have process fluids flowing outward from a center manifold (hole) to a manifold at the perimeter and then returning radially back to a second central manifold before existing the reactor. Embodiments include options for placing catalysts, either the same or different, in both out flowing and return channels; catalyst only in the outflowing channels; or catalyst only in the return channels. FIG. 8 shows an internal wall 86 inside a tube or capsule-tube for dividing the outflowing and return channels with catalyst 88 placed in one or the other. FIG. 8 shows a symmetric channel with equal division of the volume between the outflowing 88 and return 84 channels. Other embodiments would have the wall shifted downward or upward to have more volume for the outflowing or return channels, respectively. Still other embodiments would have asymmetric structures with one profile for the outflow channels and a different profile for the return channels. For example, the return channels could have a different pitch, e.g. doubling the pitch would have two return channels for each outflow channel to enhance heat transfer in the return channels.

FIGS. 4-6 and 8 indicate the return channels follow the same path as the outflow channels, such as a split tube shown in FIG. 8. In other embodiments, the design of the return channel structure can be decoupled from the outflow channels. One example, is a counter-spiral structure of the predecessor IDR, Solar Thermochemical Reactor with Reaction and Thermal Recuperation Channels Arranged in Counter Spirals. Having the return flow channels cross and being in thermal contact with multiple outflow channels has advantages for thermal spreading and more uniform temperatures within the reactor. Various methods for configuring the two flow channel structures for mechanical support of a pressurized reactor are envisioned. A perimeter manifold can be designed to simply return the fluid in a given outflow channel back through the adjacent return channel when the structure is symmetric. Alternatively, the manifold can return the fluid through the return channel of another outflow channel. One reason would be to provide thermal communication and heat spreading between areas of the reactor. Other embodiments will have open manifolds for allowing mixing of fluid from multiple outflow channels before entering return channels. A perimeter manifold can mix fluid from 2 or more outflow channels up to the entirety of outflow channels.

Enhanced Heat Exchange:

Heat transfer of incident solar flux from the surface of the reactor and through the outer wall and catalyst structure to support endothermic heterogeneous reactions and other processes is critical for reactor performance. A key aspect of the invention is thinning the outer wall to reduce heat transfer resistance through the outer wall. Heat transfer within open return channels can also be important. For example, transferring heat from the hot fluid in the return channels to the catalyst structure in the outflow channels can increase solar to chemical energy conversion and improve overall system energy efficiency. Various techniques for enhancing heat transfer in either the outflow or return channels are anticipated. Extended area structures such as straight fins, louvered fins, pins or other structures can be created during reactor fabrication extending from the dividing wall, which is the primary heat transfer surface between the outflow and return channels, into the flow channels or catalyst structures. Such extended area structures can also be created during reactor fabrication extending from the wall receiving solar flux into the catalyst structures to enhance heat transfer. Structures can also enhance heat transfer by mixing the fluid, such as with a static mixer structure.

Figure 10:
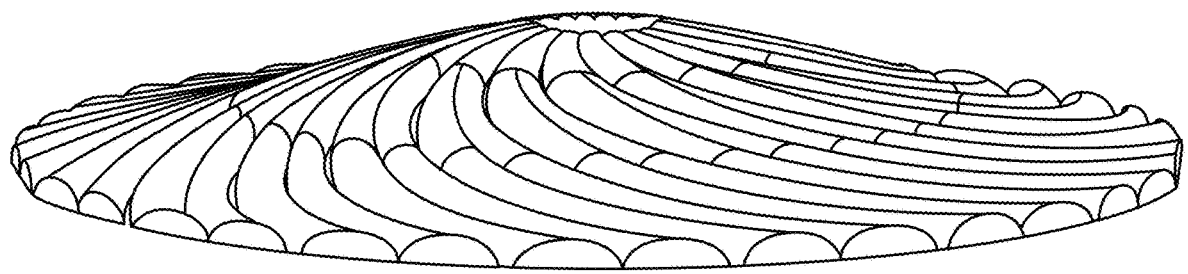
FIG. 10 is an example of a channel structure combining tubular shapes, bifurcation, and curvature in both spiral and z-directions.
Figure 11:
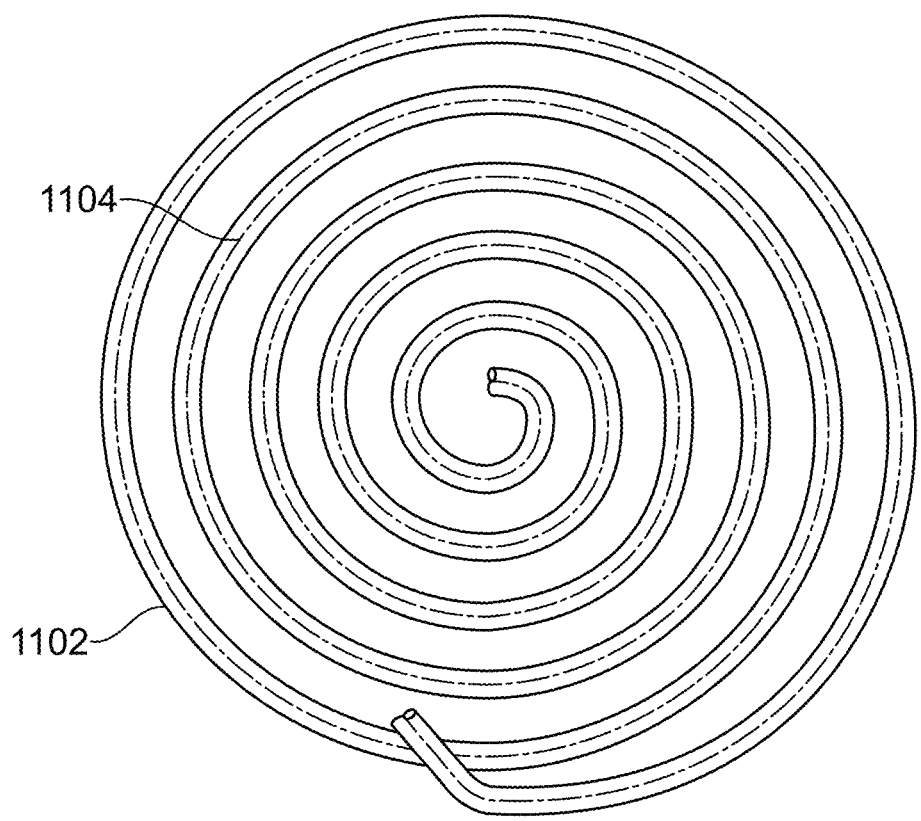
FIG. 11 illustrates chemical processor with a single channel.

Non-Planar Structures:

The reactor structures depicted in FIGS. 2-6 are planar, meaning the primary axis of the channels are all in a two-dimensional plane. The flexibility of additive manufacturing allows for 3-D structures that allow the flow channels to curve out of the primary plane of the reactor—curvature in the so-called z-direction. Benefits of 3-D structures include greater external surface area to receive incident solar energy, thereby reducing the average local heat flux into the reactor. Another benefit is to reduce thermal stresses associated with thermal expansion of the structure. One embodiment of a 3-D structure would be a dome or hemispherical structure. An example of this kind of structure is illustrated in FIG. 10. This convex structure allows the hottest outer surface receiving the incident solar to expand more than the cooler underside, thereby reducing stresses within the structure. A hemisphere with a circular cross-section is only one of many potential 3-D shapes. Others include parabolic and S-shaped. Alternative shapes create the opportunity to locally customize the incident angle of the flux on the reactor outer surface to better match the characteristics of the paired solar concentrator and alleviate hot spots due to optical imperfections.

Pressure Drop Structures:

Uniform flow distribution between the channels is desired for consistent residence time and exposure to the catalyst and heat transfer. Features are often added at the entrance or exit (or could be anywhere within the flow path) to create pressure drop that will help to distribute the flow uniformly. Features can include an orifice or other flow restriction; increased flow path length, such as a serpentine smaller channel, or a porous wall. These features can be added during the additive manufacturing fabrication process.

Other Processes:

The primary application of the invention is a solar thermal chemical reactor that uses incident solar radiation to provide heat to a heterogeneous catalyst for the endothermic steam methane reforming reaction. Other endothermic processes are also anticipated including other endothermic chemical reactions, such as dry reforming of methane with CO2 or the reverse water gas shift reaction. Examples of reactor designs, including differential temperature reactors for endothermic and exothermic reactions, that can be fabricated using the techniques described herein and corresponding reactions are described in U.S. Pat. No. 7,297,324 which is incorporated herein as if reproduced in full below. Differential temperature reactors accomplish improved chemical conversion, compared to adiabatic reactors, for equilibrium-limited reactions that exhibit substantial temperature dependence. Differential temperature microchannel or mesochannel reactors include adding heat (for endothermic reactions) or removing heat (for exothermic reactions), such as through the use of adjacent channels through which a heat exchange fluid flows or another reaction occurs. Preferably, the heat exchange function achieves a temperature trajectory down the length of the reaction channel that encourages greater chemical conversion.

Aspects of the invention could also be used in a solar receiver, where the solar energy is converted to sensible or latent heat within a heat transfer fluid. Other examples are sorption processes for heat pumps or chemical separations. For example, solar heat pumps transfer heat from a lower temperature to a hotter temperature using absorption (liquid solvent) or adsorbent (solid sorbent) heat pump cycles. An example is replacing the catalyst in the above invention with a solid sorbent that adsorbs refrigerant at low temperature and pressure and desorbs at higher temperature and pressure using solar energy. Applications include building heating ventilation and air condition (HVAC) and refrigeration. Similarly, the sorbent can be used for chemical separations in a thermal swing adsorption (TSA) process or a thermally-enhanced, pressure swing adsorption (PSA) process. One application would be capturing carbon dioxide from the atmosphere, power plant effluents, or other potential sources.

Catalyzed chemical reactions are very well known and appropriate conditions and catalyst are very well known and do not need to be described here; it is sufficient to identify catalysts as reforming catalysts, or Sabatier catalysts (commonly Ni or $Ru/Al_2O_3$), ammonia synthesis (commonly Ru, or iron oxide, or Co—Mo—N), or reverse-water-gas shift reaction (common catalysts comprise oxides of iron, chromium, and optionally magnesium).

In some preferred embodiments, the invention converts methane or other alkane or mix of hydrocarbons to hydrogen by steam or dry reforming. A steam reforming process requires a hydrocarbon (or hydrocarbons) and steam ($H_2O$). A reactant mixture can include other components such as CO or nonreactive diluents such as nitrogen or other inert gases. In some preferred processes, the reaction stream consists essentially of hydrocarbon and steam. In some preferred embodiments, the steam to carbon ratio in a reactant stream is 3 to 1 to 1 to 1, and in some embodiments 1.5 to 1 or less. Hydrocarbons include: alkanes, alkenes, alcohols, aromatics, and combinations thereof. A hydrocarbon can be natural gas. Preferred alkanes are $C_1$-$C_{10}$ alkanes, such as methane, ethane, propane, butane, and isooctane. A steam reforming catalyst preferably comprises one or more of the following catalytically active materials: ruthenium, rhodium, iridium, nickel, palladium, platinum, and combinations thereof. Rhodium is particularly preferred. In some preferred embodiments, the catalyst (including all support materials) contains 0.5 to 10 weight percent Rh, more preferably 1 to 3 wt % Rh. The catalyst may also contains an alumina support for the catalytically active materials. An "alumina support" contains aluminum atoms bonded to oxygen atoms, and additional elements can be present. Preferably, the alumina support comprises stabilizing element or elements that improve the stability of the catalyst in hydrothermal conditions. Examples of stabilizing elements are Mg, Ba, La, and Y, and combinations of these. Preferably, the catalytically active materials (such as Rh) are present in the form of small particles on the surface of an alumina support. The steam reforming reaction is preferably carried out at more than 400° C., more preferably 500-1000° C., and still more preferably 650-900° C. The reaction can be run over a broad pressure range from sub-ambient to very high, in some embodiments the process is conducted at a pressure of from 10 atm to 30 atm, more preferably 12 atm to 25 atm. The $H_2O$ partial pressure is preferably at least 0.2 atm, in some embodiments at least 2 atm, and in some embodiments in the range of 5 atm to 20 atm.

In some preferred configurations, the catalyst (either for steam reforming or other chemical reactions) includes an underlying large pore substrate. Examples of preferred large pore substrates include commercially available metal foams and, more preferably, metal felts. Prior to depositing any coatings, a large pore substrate has a porosity of at least 5%, more preferably 30 to 99%, and still more preferably 70 to 98%. In some preferred embodiments, a large pore substrate has a volumetric average pore size, as measured by BET, of 0.1 μm or greater, more preferably between 1 and 500 μm. Preferred forms of porous substrates are foams and felts and these are preferably made of a thermally stable and conductive material, preferably a metal such as stainless steel or FeCrAlY alloy. These porous substrates can be thin, such as between 0.1 and 1 cm. Foams are continuous structures with continuous walls defining pores throughout the structure. Alternatively, the catalyst may take any conventional form such as a powder or pellet.

A catalyst with a large pores preferably has a pore volume of 5 to 98%, more preferably 30 to 95% of the total porous material's volume. Preferably, at least 20% (more preferably at least 50%) of the material's pore volume is composed of pores in the size (diameter) range of 0.1 to 300 microns, more preferably 0.3 to 200 microns, and still more preferably 1 to 100 microns. Pore volume and pore size distribution are measured by mercury porisimetry (assuming cylindrical geometry of the pores) and nitrogen adsorption. As is known, mercury porisimetry and nitrogen adsorption are complementary techniques with mercury porisimetry being more accurate for measuring large pore sizes (larger than 30 nm) and nitrogen adsorption more accurate for small pores (less than 50 nm). Pore sizes in the range of about 0.1 to 300 microns enable molecules to diffuse molecularly through the materials under most gas phase catalysis conditions. A catalyst insert preferably has a height of 1 cm or less, in some embodiments a height and width of 0.1 to 1.0 cm. In some embodiments, the porous insert occupies at least 60%, in some embodiments at least 90%, of a cross-sectional area of a microchannel. In an alternative preferred embodiment, the catalyst is a coating (such as a washcoat) of material within a reaction channel or channels.

What is claimed is:

1. A chemical processor having a circular shape comprising a tube or a plurality of tubes providing radial fluid flow from a source inlet or source manifold near a central region of the processor to a perimeter of the processor, wherein the tube or plurality of tubes is exposed on an exposed surface of the chemical processor so that the surface is not smooth; wherein the tube or plurality of tubes have a cross-section that is circular, oval, or oblate circular, and wherein the processor is configured for a unit process.

2. The chemical processor of claim 1 comprising a plurality of channels providing radial fluid flow from the perimeter to a receiving manifold, wherein the receiving manifold is located near a central region of the chemical processor.

3. The chemical processor of claim 1 wherein the tube or plurality of tubes and channels have an internal dimension of 1 cm or less.

4. The processor of claim 1, wherein the tube or plurality of tubes comprise a straight radial channel.

5. The processor of claim 1, wherein the tube or plurality of tubes comprise a curved channel extending from the central region to the perimeter.

6. The processor of claim 1, wherein the tube or plurality of tubes, comprises a porous insert embedded within the tube or plurality of tubes.

7. The processor of claim 6, wherein the porous insert comprises a catalyst material, a sorbent material, or both.

8. The processor of claim 6 wherein the porous insert comprises porous metallic support having a nonporous metal film welded to a surface of the porous metallic support.

9. The processor of claim 1 wherein the exposed surface is a domed surface.

10. The processor claim 9, further comprising a solar concentrator arranged to focus concentrated solar energy at the exposed surface.

11. The processor of claim 1, wherein the exposed surface comprises the tube or plurality of tubes and wherein the tube or plurality of tubes have a gradient of thermal expansion coefficients with the low thermal expansion coefficient on the exposed surface.

12. A chemical processor having a circular shape comprising a tube or a plurality of tubes providing radial fluid flow from a source inlet or source manifold near a central region of the processor to a perimeter of the processor, wherein the tube or plurality of tubes is exposed on an exposed surface of the chemical processor so that the surface is not smooth; wherein the tube or plurality of tubes have a cross-section that is circular, oval, or oblate circular, and wherein the processor is configured for a unit process; and wherein the tube or plurality of tubes comprise a bifurcating channel that splits into two or more channels as it extends radially.

13. A microchannel or mesochannel device comprising a first plurality of microchannels or mesochannels providing radial fluid flow from a source manifold to a perimeter of the device and a second plurality of channels providing radial fluid flow from the perimeter to a receiving manifold, wherein the source manifold and the receiving manifold are located near a central region of the device, and wherein the device is configured for a unit process; and further comprising a catalyst insert or plurality of catalyst inserts disposed around the perimeter of the device where the direction of flow in the channels switches from toward the perimeter to away from the perimeter, and comprising a ring disposed around the periphery of the device that encloses the catalyst insert or plurality of catalyst inserts and a flow path where the direction of flow in the channels switches from toward the perimeter to away from the perimeter.

14. The microchannel or mesochannel device of claim 13 wherein the catalyst inserts are wedge-shaped.

15. The microchannel or mesochannel device of claim 13 wherein the first plurality of microchannels or mesochannels, the second plurality of channels, or both, have an internal dimension of 1 cm or less.

16. The microchannel or mesochannel device of claim 13, wherein the first plurality of microchannels or mesochannels, the second plurality of channels, or both, comprise a straight radial channel.

17. The microchannel or mesochannel device of claim 13, wherein the first plurality of microchannels or mesochannels, the second plurality of channels, or both, comprise a curved channel extending from the central region to the perimeter.

18. The microchannel or mesochannel device of claim 13, further comprising a solar concentrator arranged to focus concentrated solar energy at the device.

19. The microchannel or mesochannel device of claim 13, wherein the catalyst insert or plurality of catalyst inserts are disposed both within the first plurality of microchannels or mesochannels and the second plurality of channels.

20. The microchannel or mesochannel device of claim 13 wherein the catalyst insert or plurality of catalyst inserts comprises a catalyst for steam reforming or reverse gas shift reactions.

* * * * *